Figure 7:
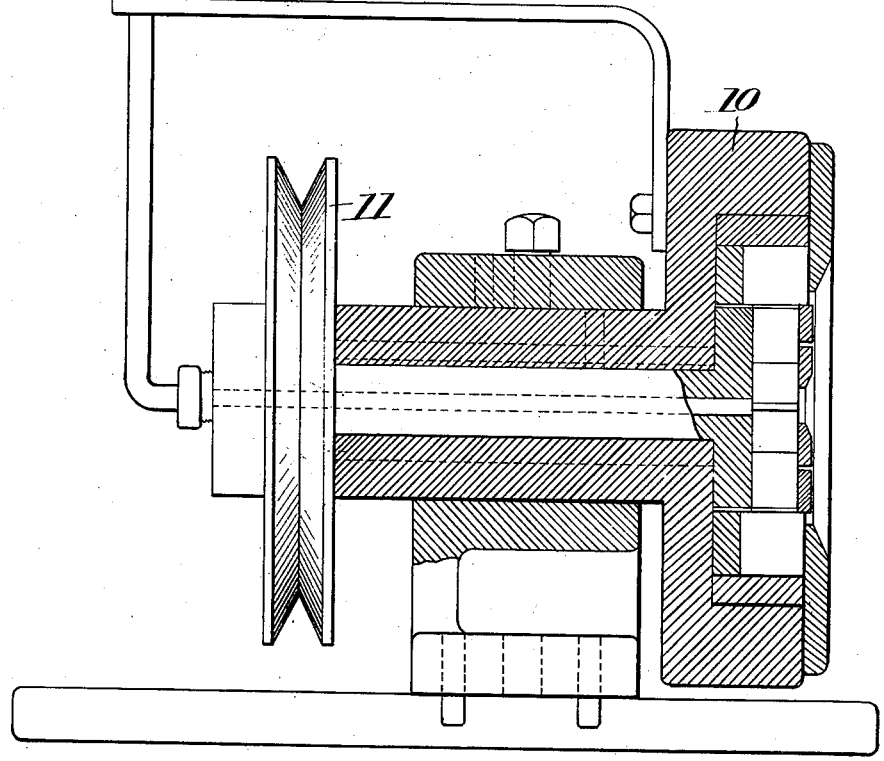

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 1.
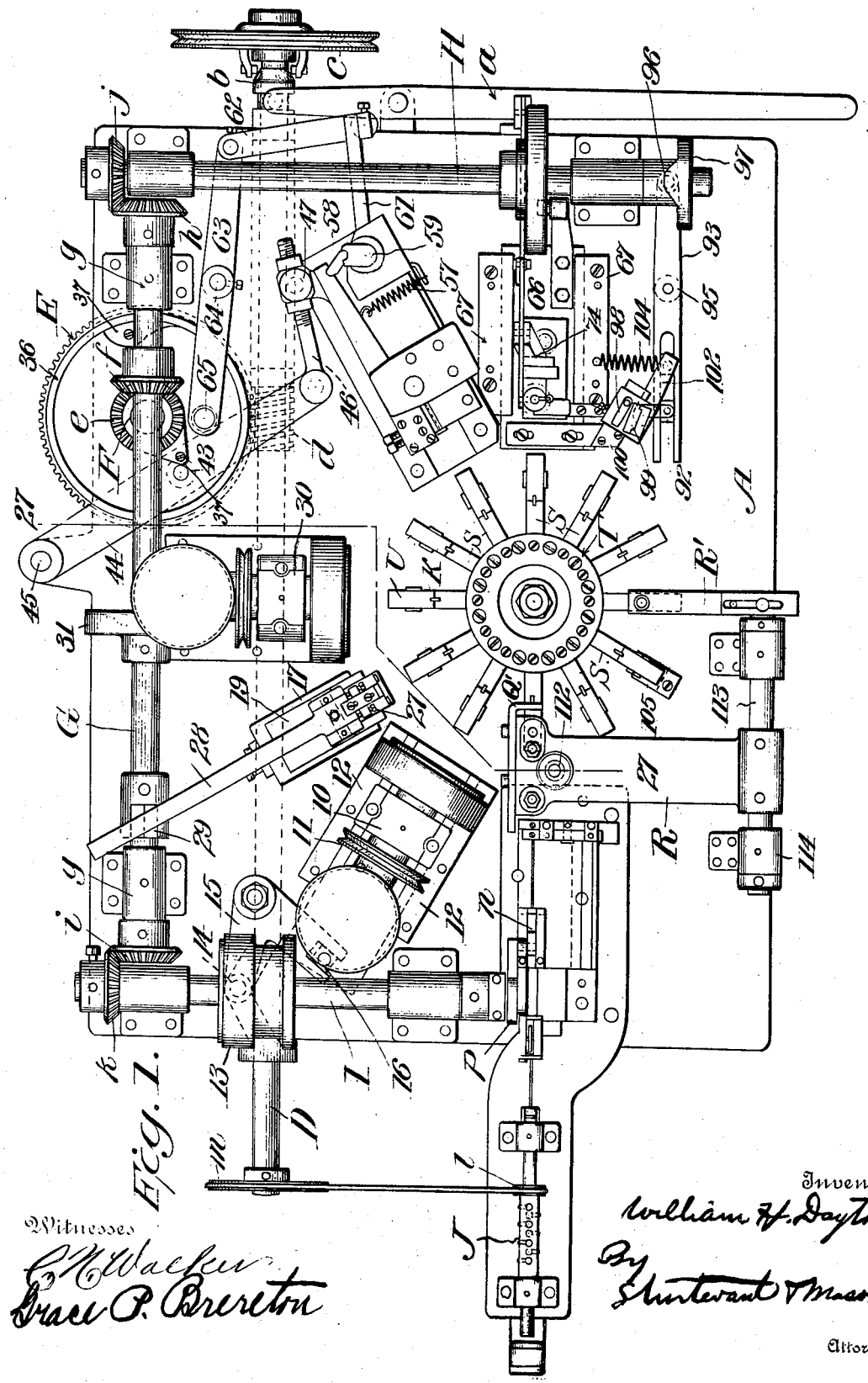
Witnesses
Inventor
William H. Dayton
By Sturtevant & Mason
Attorneys

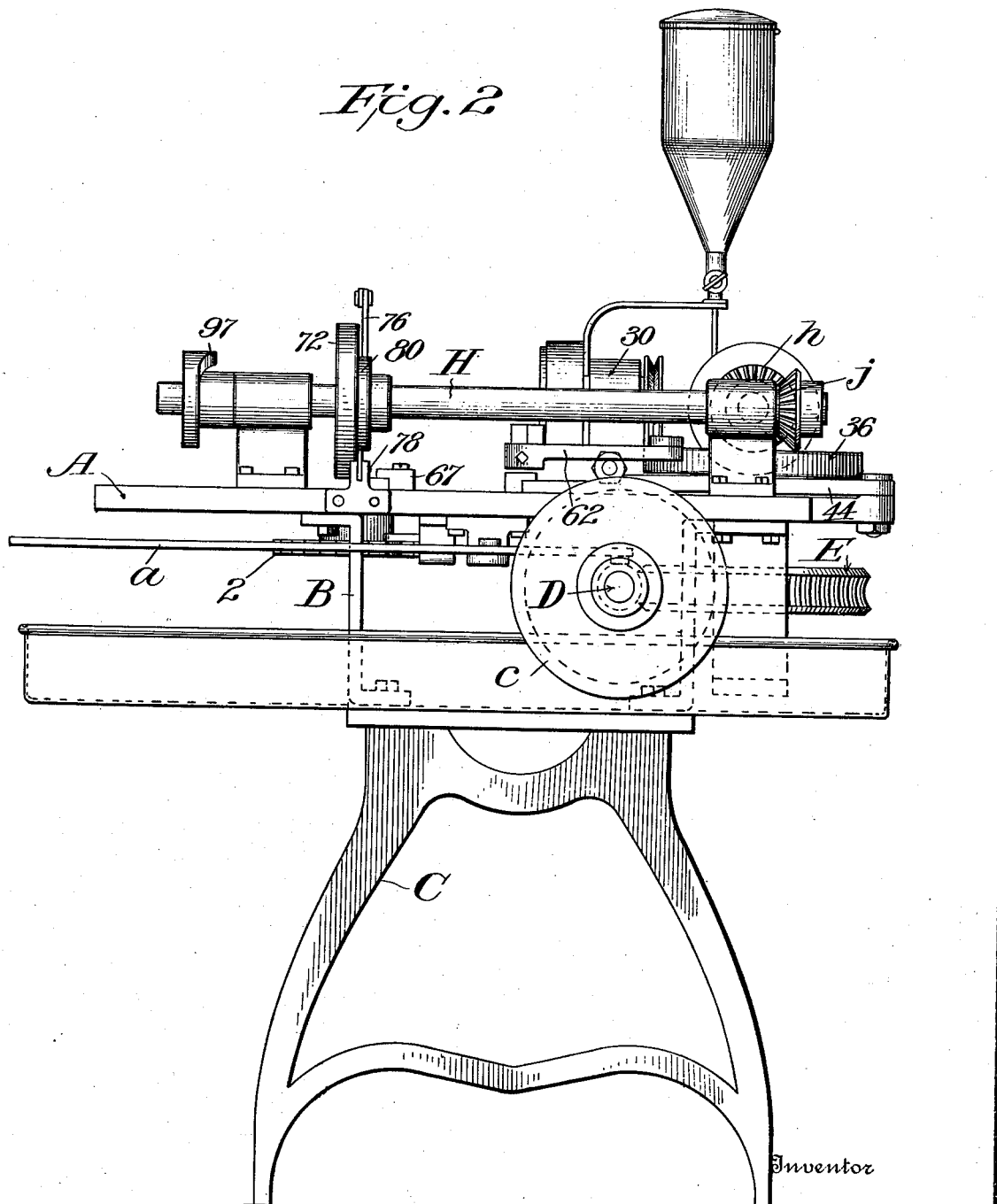

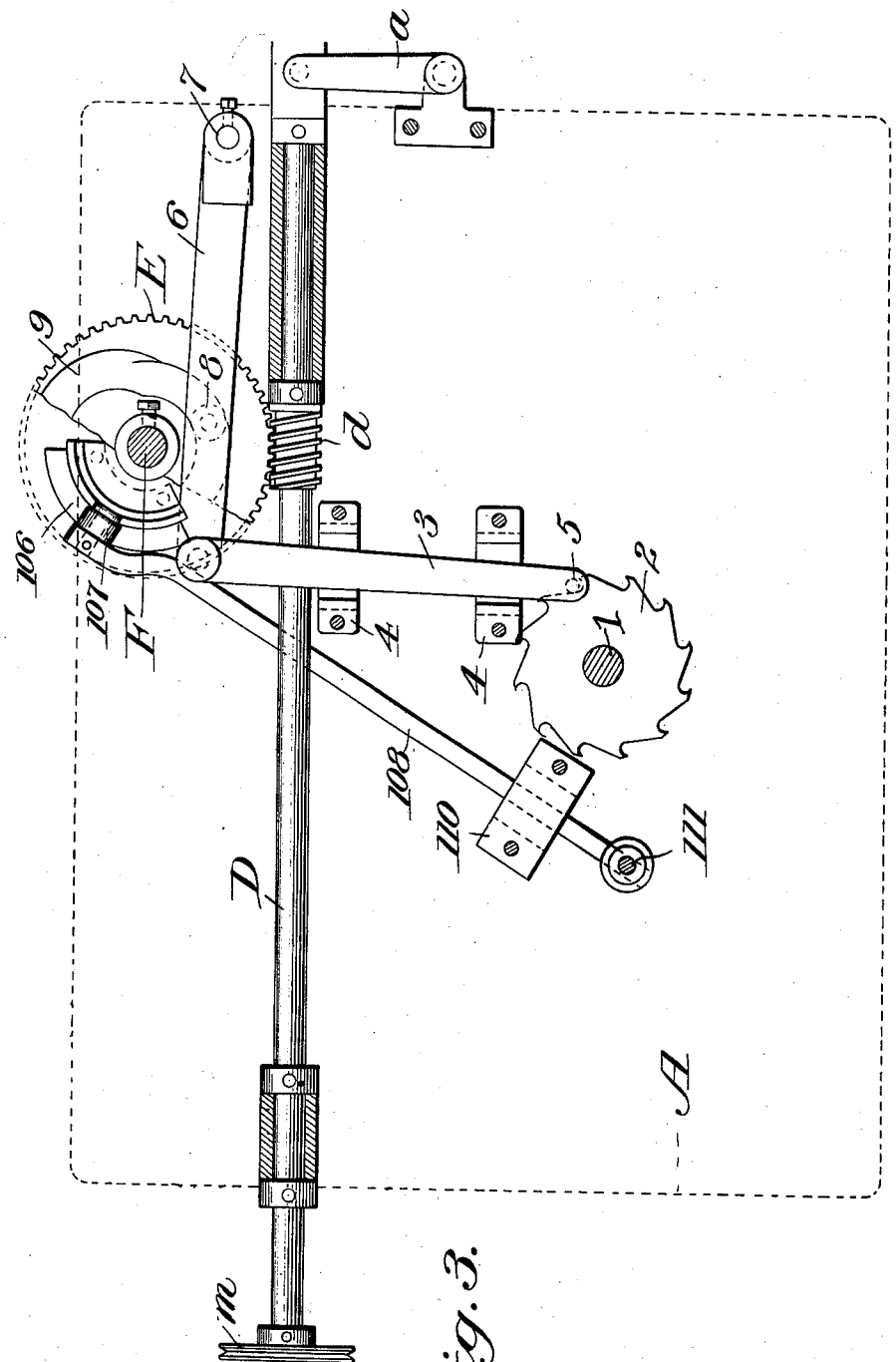

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 4.
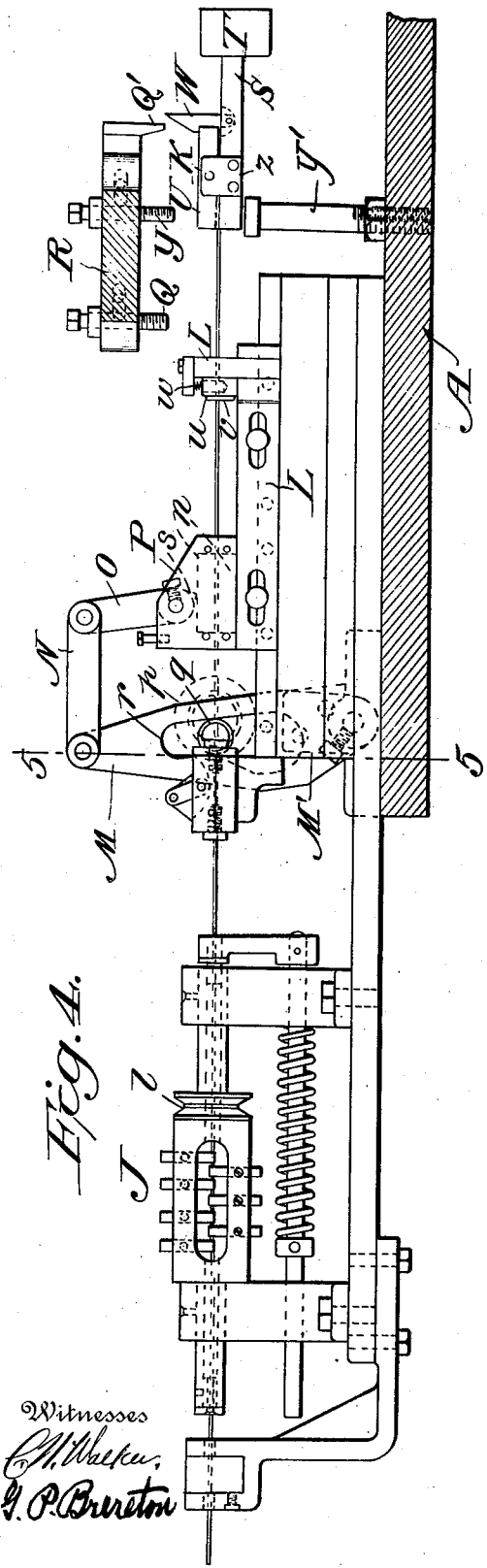
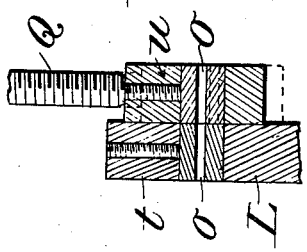
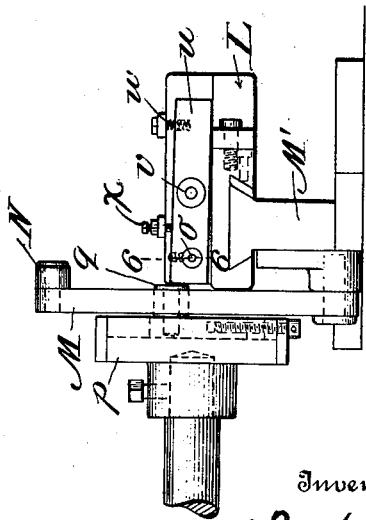

W. H. DAYTON.
AUTOMATIC SPRING BEARD NEEDLE MAKING MACHINE.
APPLICATION FILED DEC. 27, 1909.

1,136,778.

Patented Apr. 20, 1915.
17 SHEETS—SHEET 5.

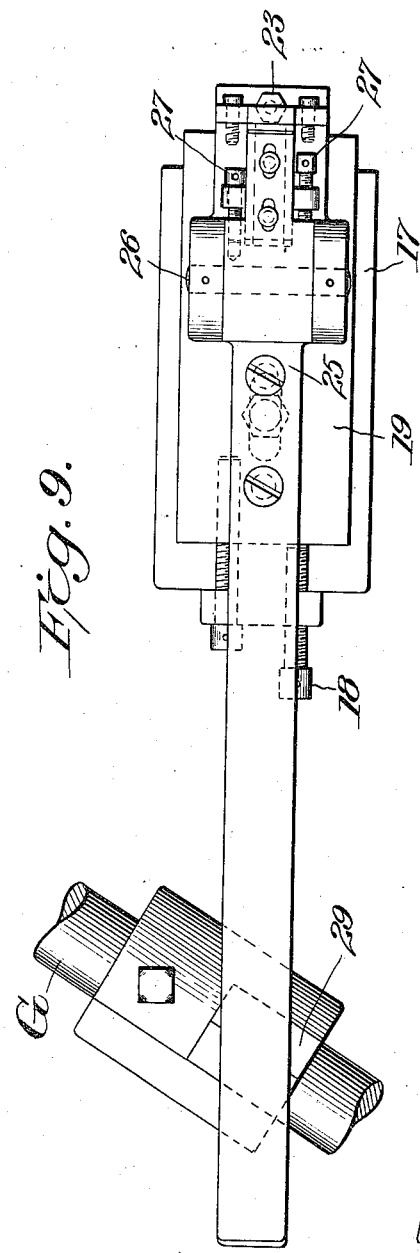
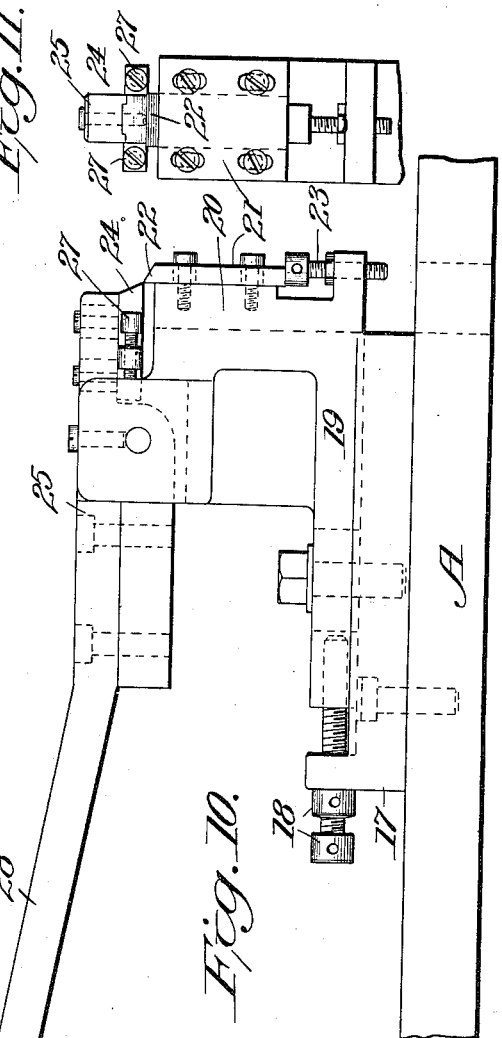
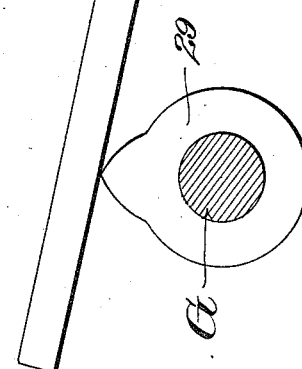

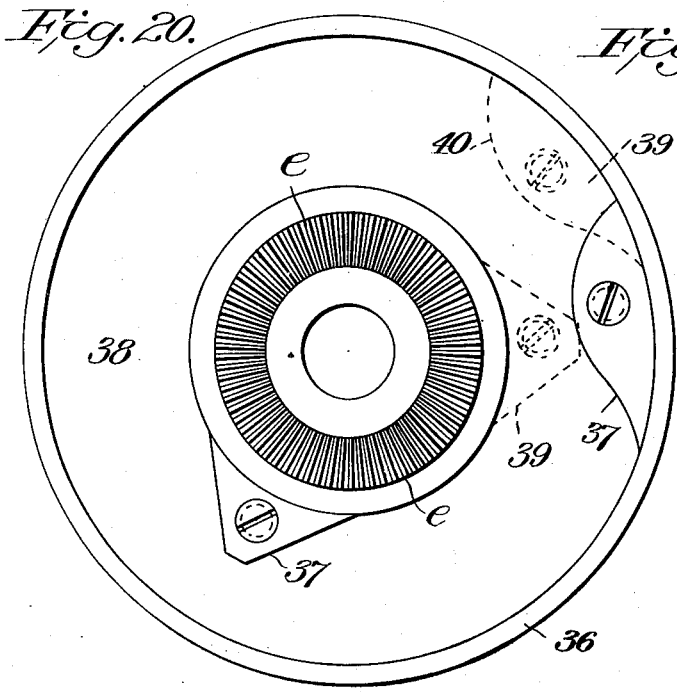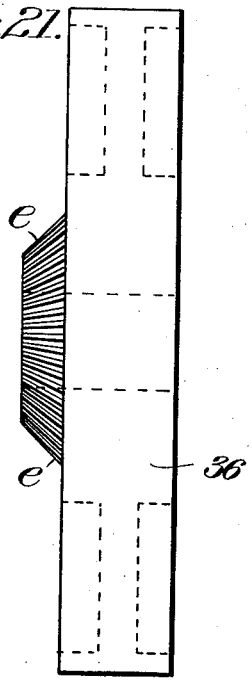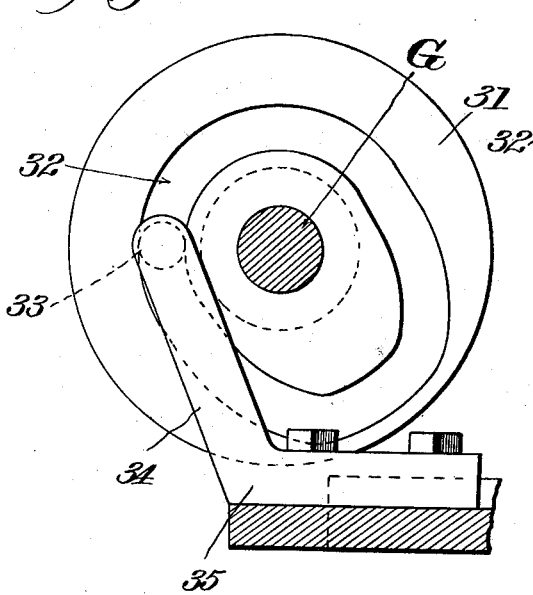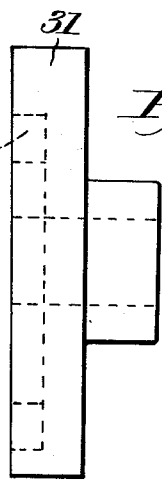

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 8.
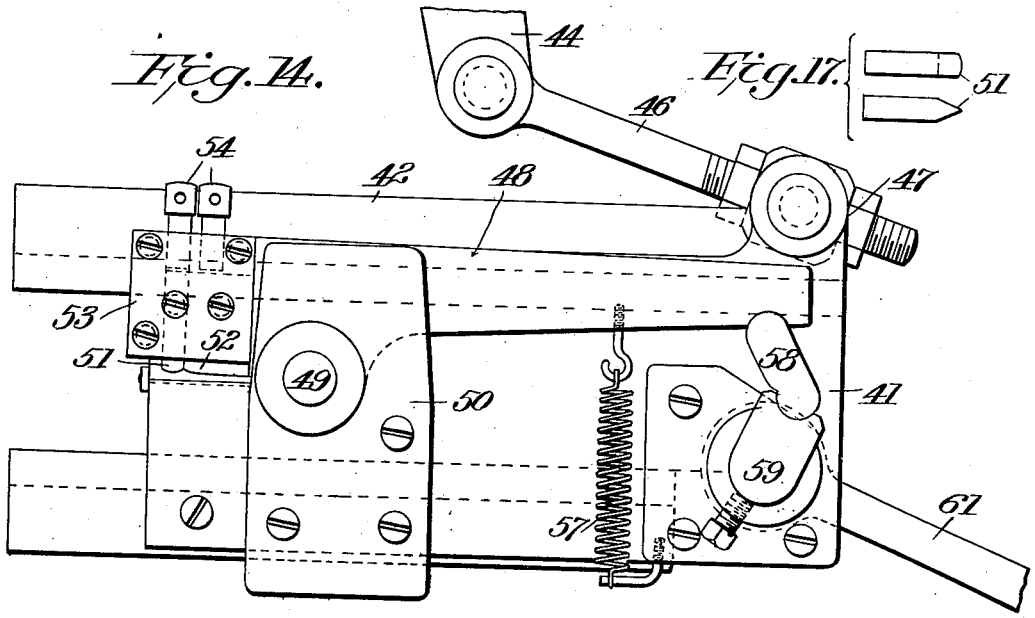
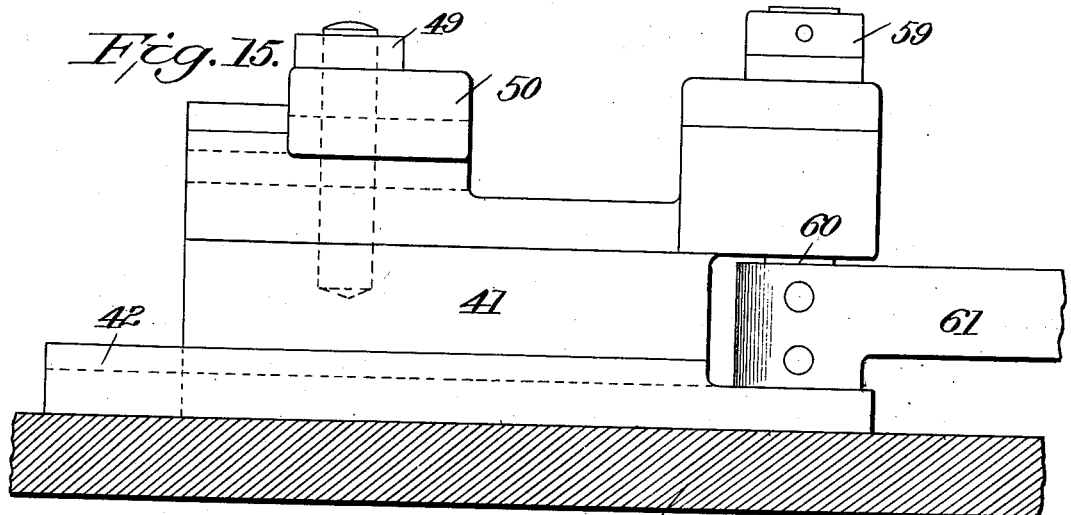
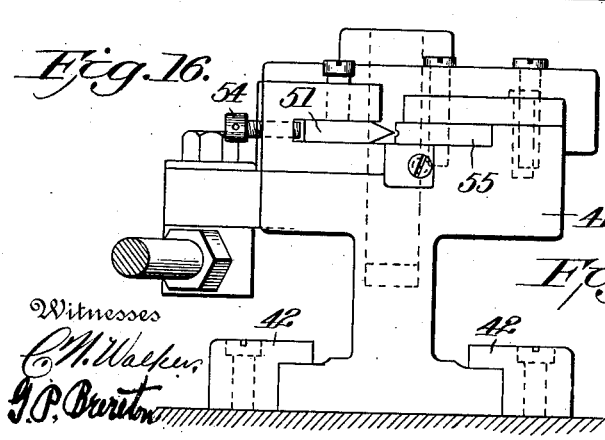
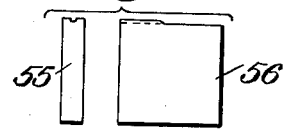
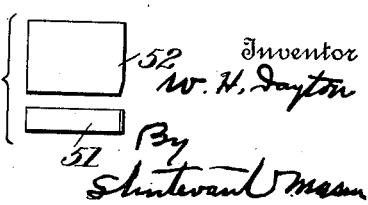

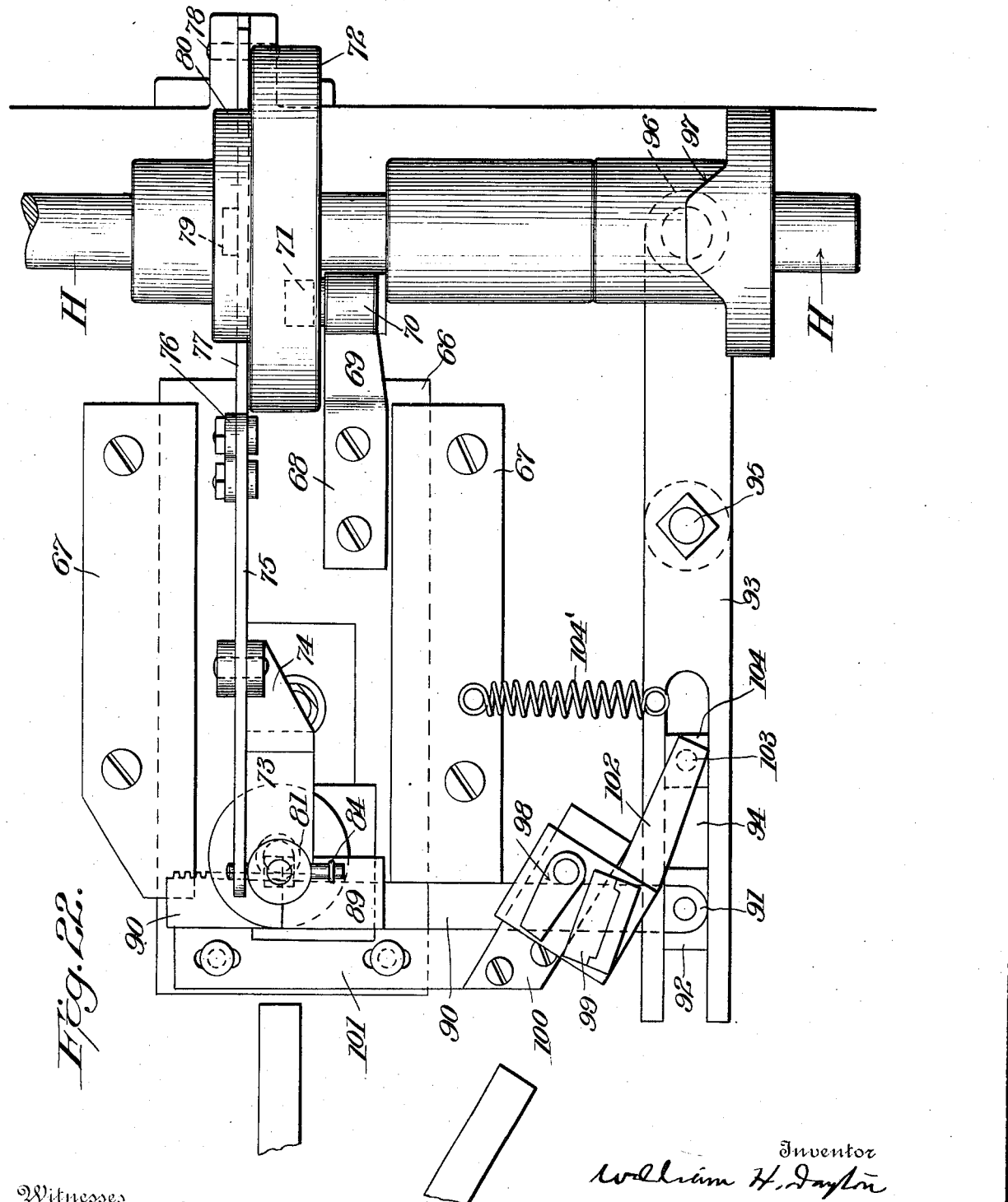

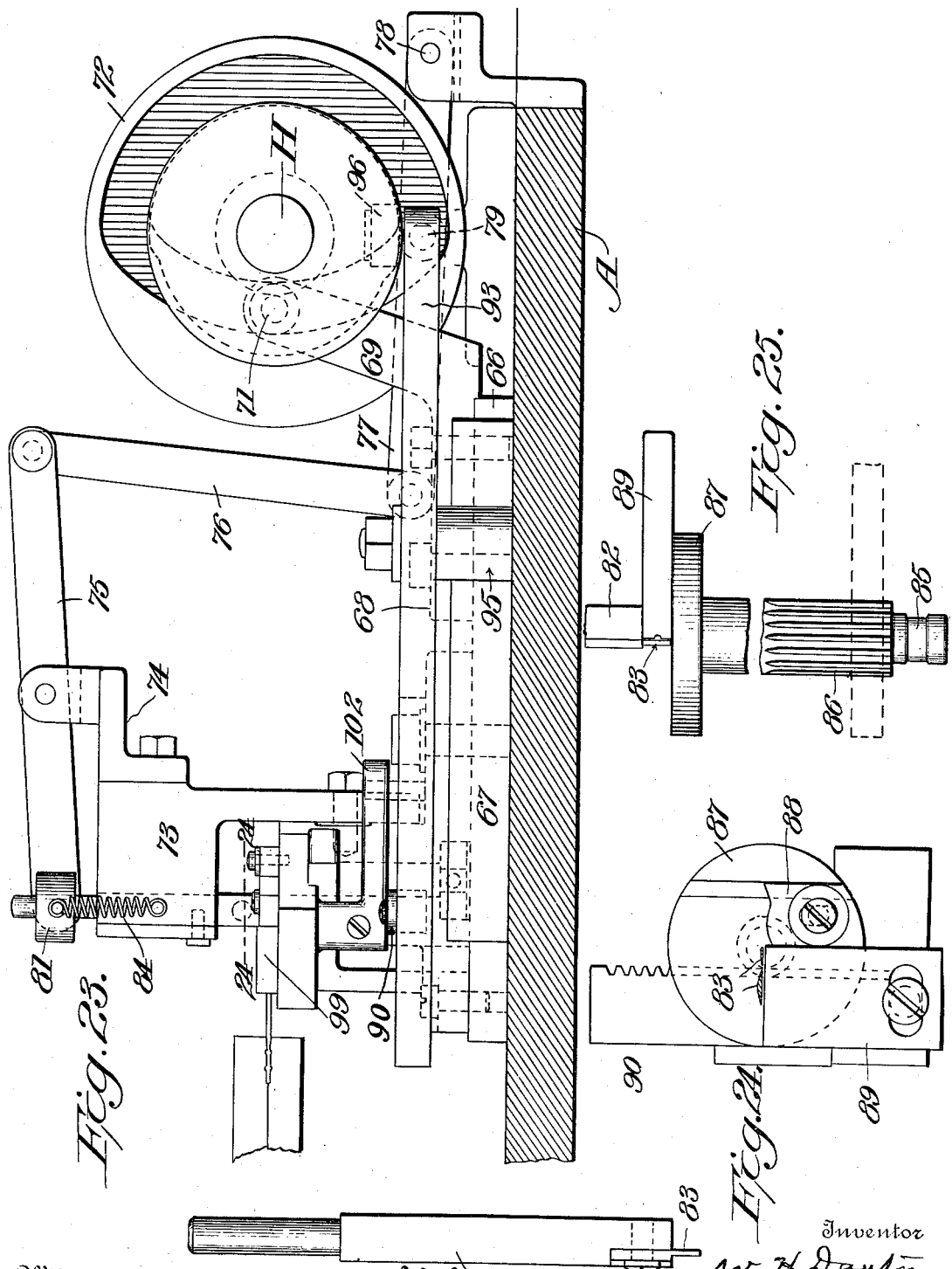

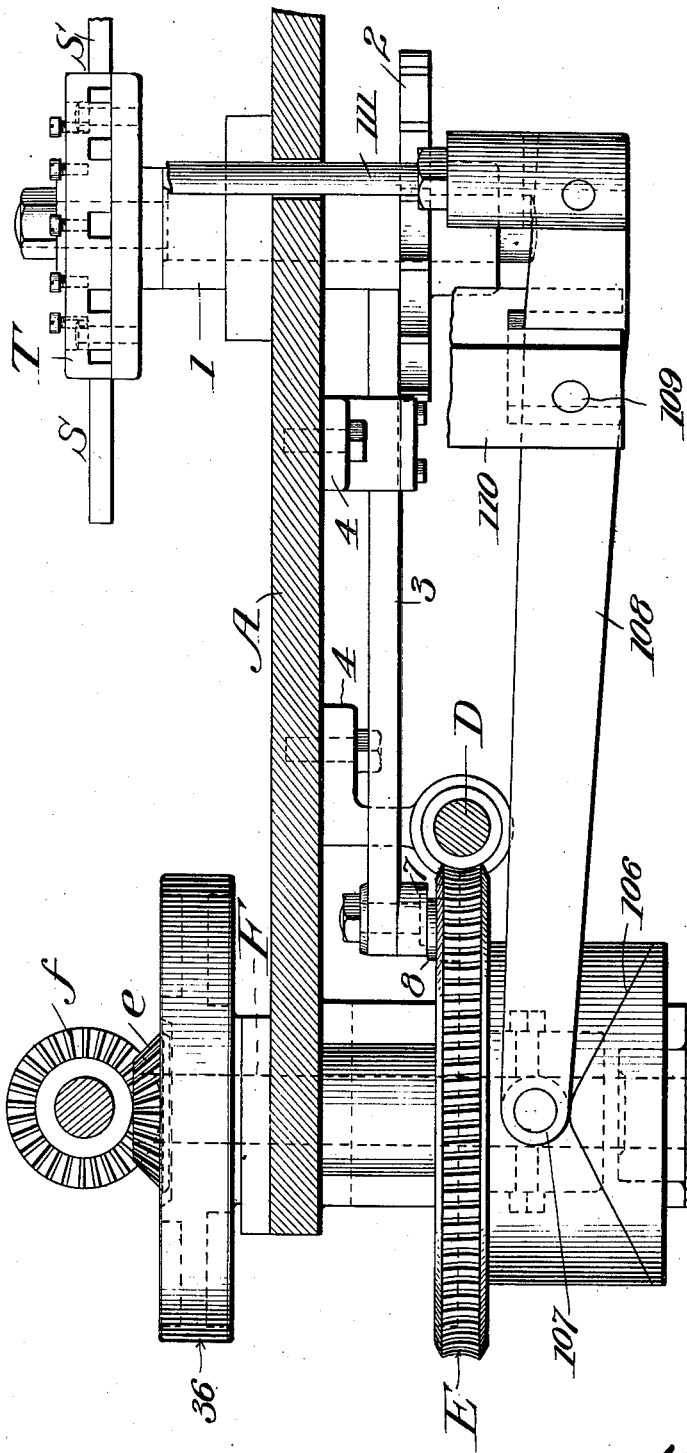

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 12.
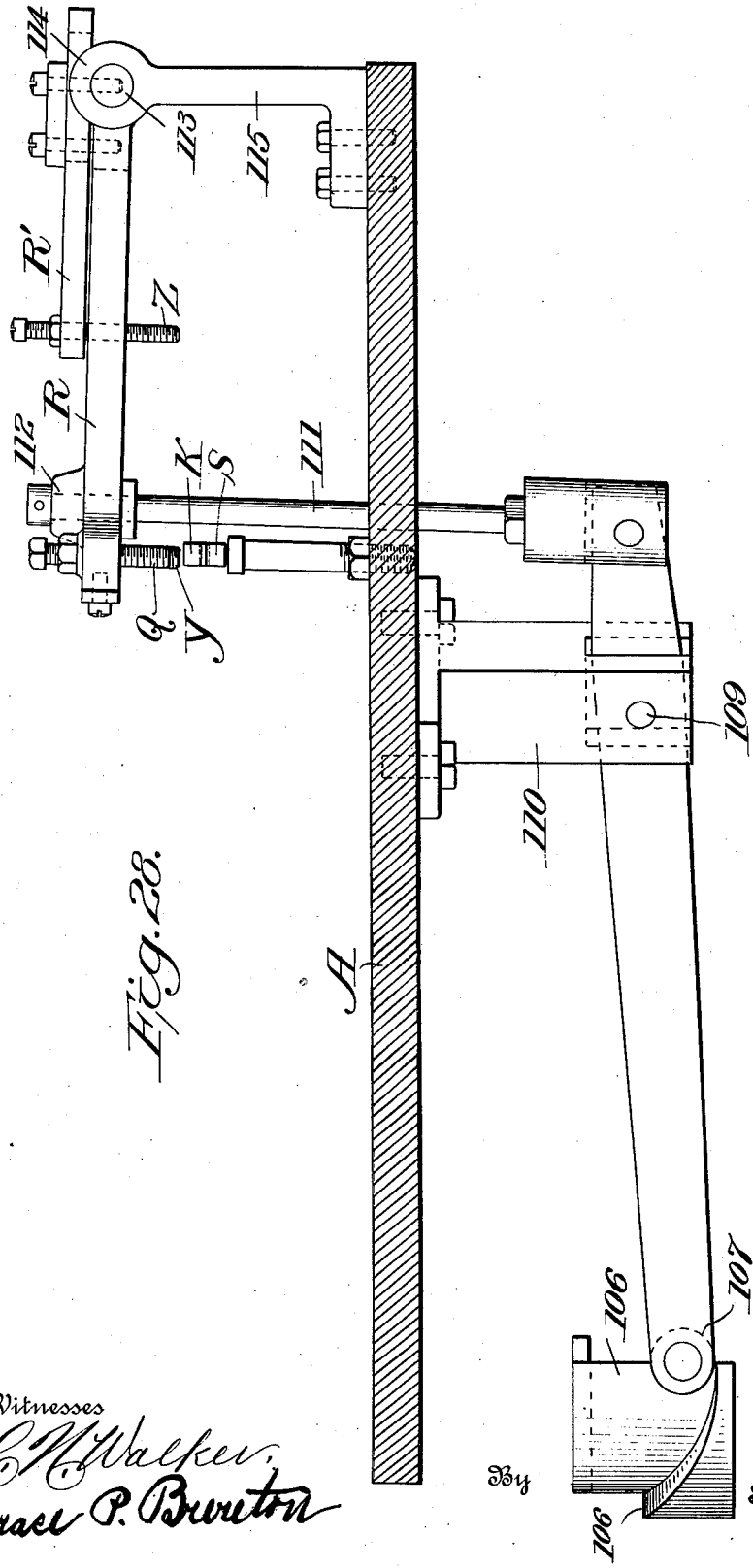

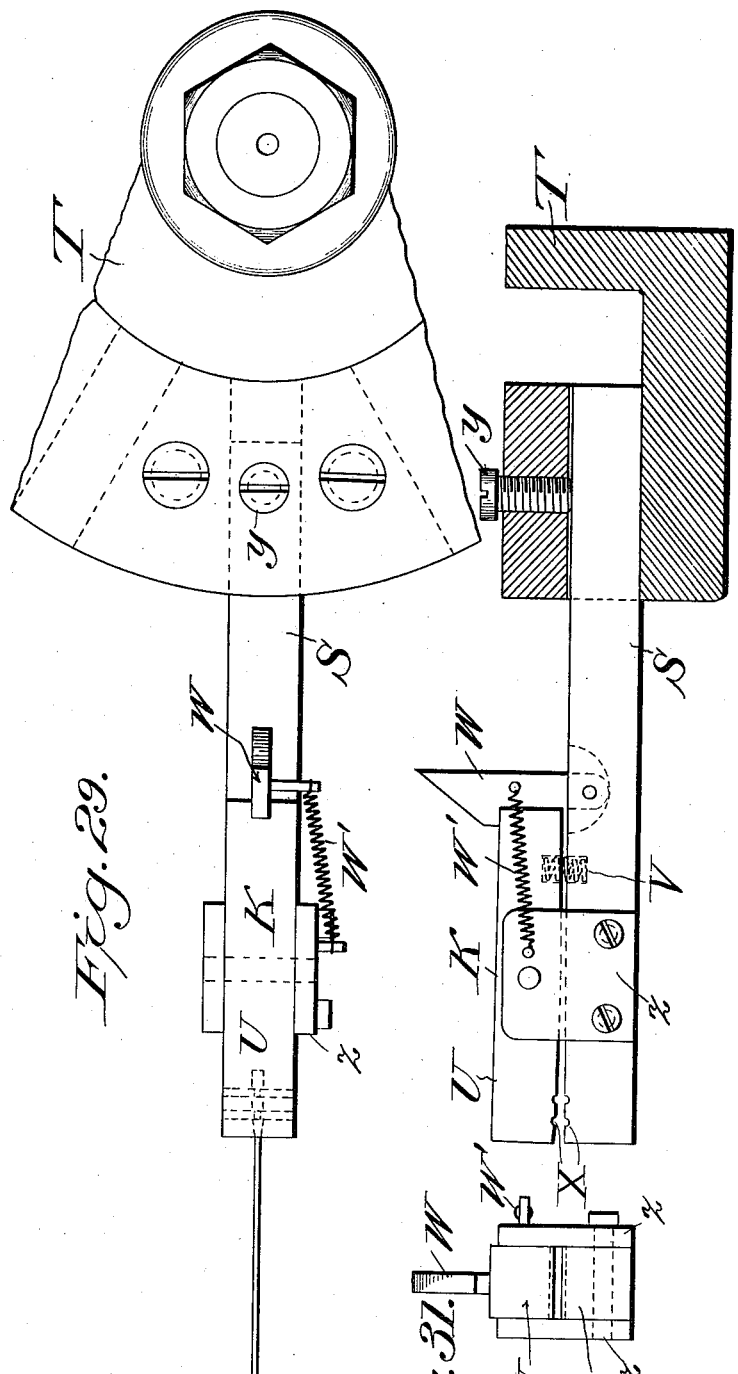

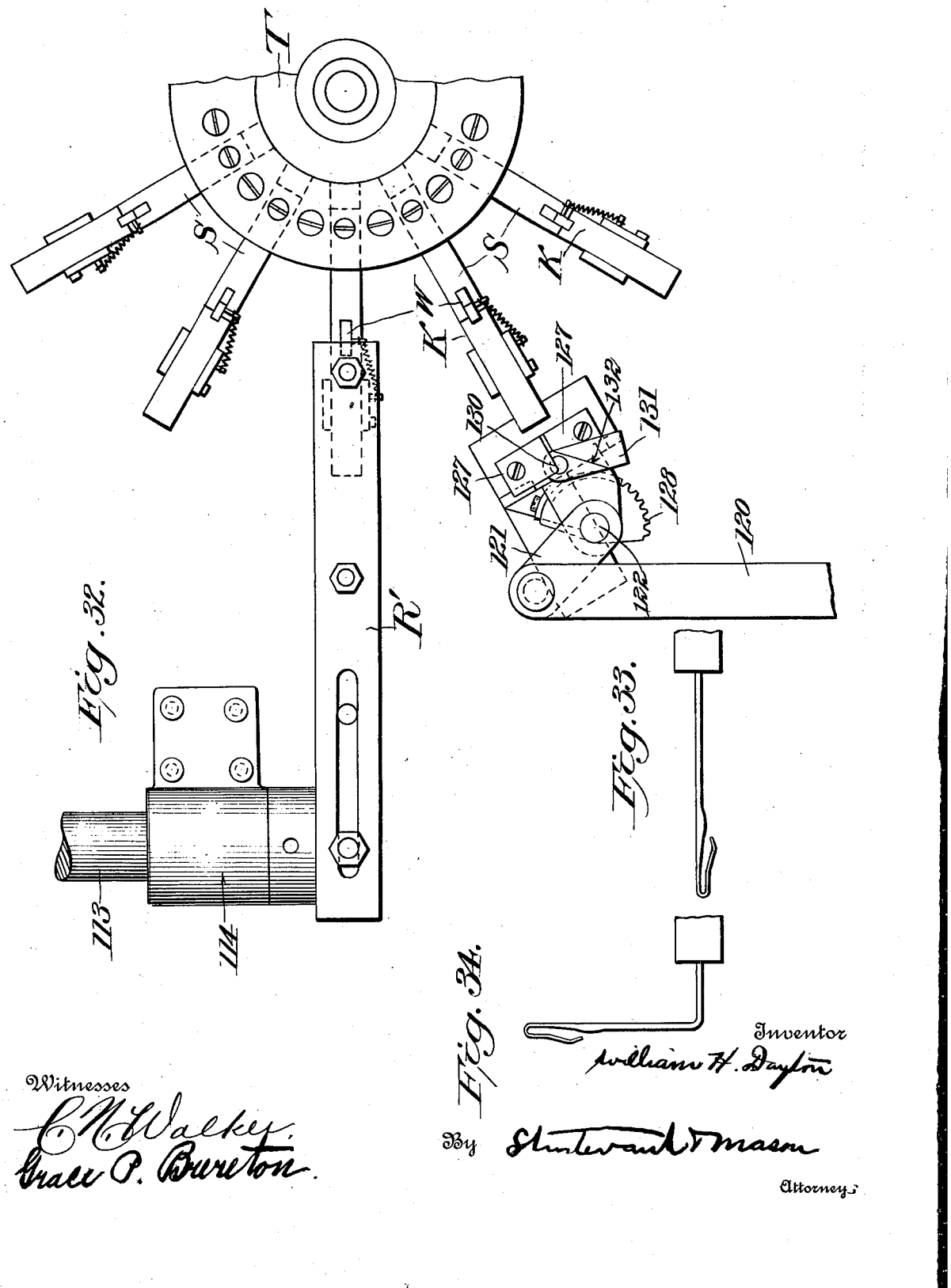

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 15.
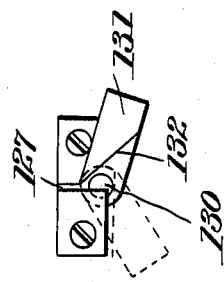
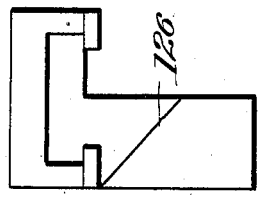
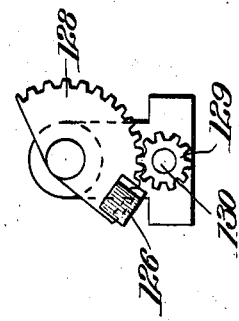
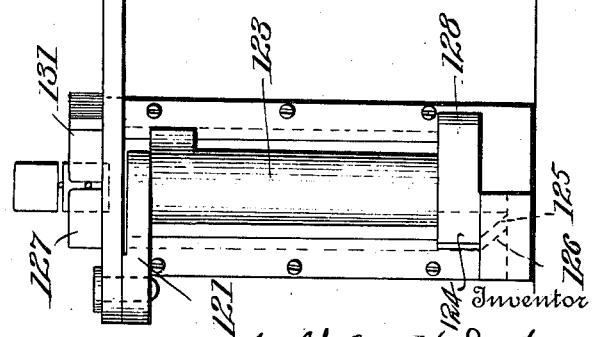

W. H. DAYTON.
AUTOMATIC SPRING BEARD NEEDLE MAKING MACHINE.
APPLICATION FILED DEC. 27, 1909.
1,136,778.
Patented Apr. 20, 1915.
17 SHEETS—SHEET 16.
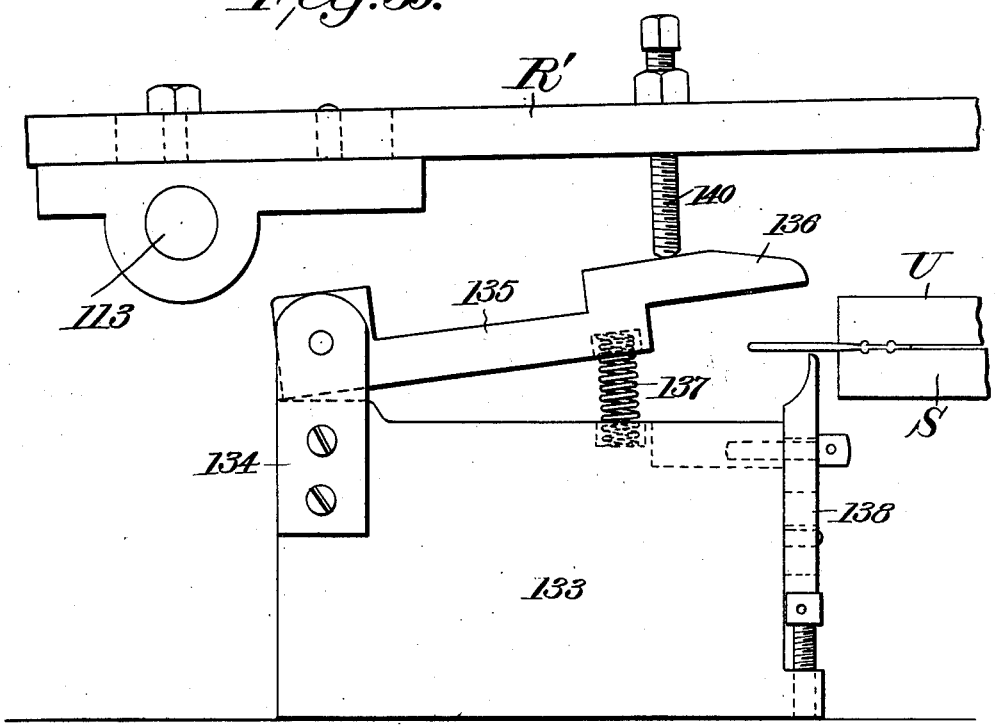
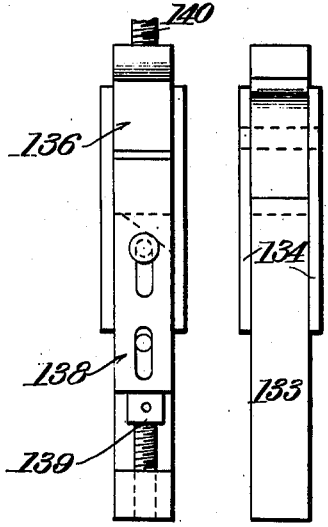
Inventor
William H. Dayton
By Sturtevant & Mason
Attorneys
Witnesses
C. H. Walker
Bruce P. Burton W. H. DAYTON.
AUTOMATIC SPRING BEARD NEEDLE MAKING MACHINE.
APPLICATION FILED DEC. 27, 1909.

1,136,778.

Patented Apr. 20, 1915.
17 SHEETS—SHEET 17.

Witnesses
Albert Popkins
Grace P. Brereton

Inventor
William H. Dayton
By Sturtevant & Mason
Attorneys

UNITED STATES PATENT OFFICE.

WILLIAM H. DAYTON, OF TORRINGTON, CONNECTICUT, ASSIGNOR TO EXCELSIOR NEEDLE COMPANY, OF TORRINGTON, CONNECTICUT, A CORPORATION OF CONNECTICUT.

AUTOMATIC SPRING-BEARD-NEEDLE-MAKING MACHINE.

1,136,778.   Specification of Letters Patent.   Patented Apr. 20, 1915.

Application filed December 27, 1909. Serial No. 535,128.

*To all whom it may concern:*

Be it known that I, WILLIAM H. DAYTON, a citizen of the United States, residing at Torrington, in the county of Litchfield, State of Connecticut, have invented certain new and useful Improvements in Automatic Spring-Beard-Needle-Making Machines, of which the following is a description, reference being had to the accompanying drawing and to the letters and figures of reference marked thereon.

The present invention relates to machines for making spring beard needles for knitting machines.

The object is to provide an automatic machine into which the wire of which the needle is to be made is fed, said wire being cut off to the proper length, and being subjected automatically to successive operating tools, and finally discharged from the machine as a finished product, ready for the final step of hardening.

Broadly, the invention comprises an automatic machine for making needles of this character, in which there is combined a rotating turret having holding jaws for the blanks which have been severed from the wire, with a series of tools for performing all the reducing operations on the blank by compression, as distinguished from milling or cutting, and having also bending tools for forming the needle beard, all of said tools being movable to and from the turret or carrier.

It also comprises an automatic machine for making spring beard needles, in which machine a single turret is used for holding the blanks, this turret being rotated with a step by step movement in order to submit the blanks to the various operations which are performed upon them, while the holding jaws of the turret itself and the various tools or appliances around or in operative relation to the turret serve to form the blanks into the finished spring beard needles, while the said blanks are held in and carried around by the single turret.

It also consists in an automatic machine for making spring beard needles, in which the holding jaws of the turret itself in conjunction with means for compressing such jaws, act as the tools for forming the notches or flats on the heads of the blanks.

Finally, the invention consists in the matters hereinafter described and referred to in the appended claims.

The invention is illustrated in the accompanying drawings, in which,—

Figure 8:
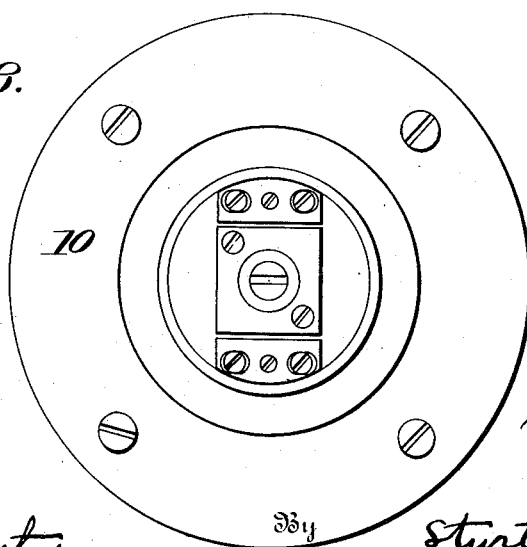

Figure 1 is a plan view of my automatic spring beard needle-making machine; Fig. 2 is an end view; Fig. 3 is a top plan view with the bed plate removed; Fig. 4 is a side elevation of the wire-straightening and feeding and cutting-off mechanism, together with a portion of the lever which carries the pins to operate the cutter, the holding jaws to flatten and notch the blank, and the projection to trip the catch and allow the jaws to close; Fig. 5 is a section on line 5—5 of Fig. 4; Fig. 6 is a section through the wire cutter on line 6—6 of Fig. 5; Fig. 7 is a sectional view of the swager, which reduces the blank down to make the part which afterward forms the beard portion; Fig. 8 is a face view of same, and it will be understood that the second swaging tool which makes the short pointed end on the blank is of practically the same construction, so far as essential elements are concerned; Fig. 9 is a plan view of the clipping mechanism which clips off the surplus end of the blank, between the two swaging operations; Fig. 10 is a side view of the same; Fig. 11 is a front view of the clipping knives; Fig. 12 is a side view of the cam for reciprocating the slide on which the second swaging tool is mounted; Fig. 13 is an edge view of the same; Fig. 14 is a top plan view of the eye-cutting and flattening mechanism; Fig. 15 is a side view of the same; Fig. 16 is an end view of Fig. 14; Fig. 17 is is a detail view in two positions of the die for cutting or pressing the eye; Fig. 18 is a detail view in two positions, of the die for flattening; Fig. 19 is a detail view in two positions of the stationary die coöperating with the die shown in Figs. 17 and 18; Fig. 20 is a plan view of the cam disk for operating the eye-cutting and flattening mechanism, the blocks shown in full lines forming the cam groove for the roller operating the cutting and flattening mechanism itself, and the bottom blocks shown in dotted lines forming the cam groove for the roller, operating to move back and forth the slide carrying these pressing devices; Fig. 21 is an edge view of Fig. 20; Fig. 22 is a plan view of the mechanism for moving the beard-bending tools back and forth, and for operating the tools themselves to do the bending; Fig. 23 is a side elevation of the same; Fig. 24 is a horizontal detail, partly in section, on line 24—24 of Fig. 23; Fig. 25 is a detail elevation of Fig. 24; Fig. 26 is an elevation of the rod carrying the anvil or former, around which the material is bent to form the beard; Fig. 27 is a sectional view of the machine, taken substantially on line 27—27 of Fig. 1, parts being broken away; Fig. 28 is a side elevation of the cam and the lever which operates the swinging arm or frame on top of the machine, which arm or frame carries the pins or projections for operating the cutter to sever the blank from the wire roll; to compress the holding jaws around the blank; to flatten and notch the head; to open the holding jaws; and to trip the catch which holds them open, and allow them to close again; Fig. 29 is a plan view of a portion of the turret or carrier and one of the holding jaws; Fig. 30 is a side elevation of the same; Fig. 31 is an end view; Fig. 32 is a detail plan view, showing an additional mechanism which may be added to the machine, for bending and clipping off the needle beyond the bend, which needle is of a different type, so far as holding it in the knitting machine is concerned; Figs. 33 and 34 are detail views of this type of needle before and after bending; Fig. 35 is a side elevation of this bending mechanism; Figs. 36, 37 and 38 are different detailed plans of parts of the bending mechanism; Fig. 39 is a side view of the cutter, and Figs. 40 and 41 front and rear views thereof, respectively; Figs. 42 and 43 are detail views of the needle before and after the cutting; Figs. 44 to 50, inclusive, represent the needle itself in its various stages of completion, after having been acted on by the respective tools.

Referring now to the drawings, the framework of the machine, standards, base plate, etc., may be of any desirable construction, but, as herein shown, A represents the base or main supporting plate, upon the upper face of which are secured the various blocks having guiding ways for the different reciprocating tool slides. This base plate is firmly attached by means of angle brackets B, to the legs or standards C.

D represents the main driving shaft, suitably journaled in bearings beneath the base plate, and having the usual shifting lever $a$, and clutch connection $b$, with belt pulley $c$.

The main shaft D carries a worm gear $d$, which meshes with a large worm wheel E, on the vertical shaft F, projecting up through the base plate of the machine, and carrying in its upper end a horizontal bevel gear $e$, meshing with the vertical bevel gear $f$ on the horizontal shaft G, journaled in bearings $g$, $g$, on the base plate, and having on either end bevel gears $h$, $i$, meshing respectively with bevel gears $j$, $k$, on the ends of transverse shafts H, I, journaled on the base plate of the machine. From the main shaft, through the vertical shaft, and the longitudinal and transverse shafts, by means of various cams and levers, the greater portion of movements desired are transmitted to the operating tools of the machine.

The first step, of course, in the operations of making the needles, is the feeding in of the wire, insertion of it in the holding jaws, and the cutting of it to proper length.

Referring to Figs. 1 and 4, the wire is supplied from the usual reel, and passes through a well known wire-straightening mechanism J, a belt passing from the belt pulley $l$ of the wire straightener to the belt $m$ on the driving shaft. It passes between the gripping jaws $n$, through the registering opening $o$, $o$, in the stationary and movable parts of the cutting block, and into the holding jaw K. Movement is imparted to the slide L on which the gripping jaws are supported, in the following manner:—The shaft I has on its outer end a disk $p$ carrying a crank pin $q$, which engages a slot $r$ in a lever M pivoted to the bed plate of the machine; this has a link connection N with the lever O pivoted at its lower end to the block P on slide L, and carrying the gripping jaws. The slide L, as shown in Fig. 5, dovetails on to a guide rail or bar M', forming a way on which the slide L reciprocates. This lever O has a cam projection $s$ on its lower end, bearing on the upper gripping jaw. The slot $r$ in the lever M is slightly inclined, and in the rotation of the crank pin, the lever M is first swung toward an upright position, which causes the projection $s$ to bind on the upper gripping jaw, and force the jaws together to grip the wire; the further movement of the crank pin feeds the entire slide forward, carrying with it the wire. On the slide L is arranged the stationary and movable parts $t$, $u$, of the cutting mechanism for cutting off the blank. The parts have registering openings $o$, through which the wire passes, and the movable part $u$ of the cutter is pivoted at $v$ and spring-pressed, as shown at $w$. A slight adjustment of the movable part of the cutter is provided for by the set screw $x$. As the wire is fed forward, the movable portion of the cutter is brought under the pin Q on the operating lever R, hereinafter referred to, and in the downward movement of that lever the movable cutter is forced down and coöperates with the stationary cutter to shear off the wire.

Figure 44:
Figure 45:

At the time the wire is cut, the forward end of the blank portion is held in one of the jaws K, carried on the turret or carrier T. The holding jaw K is shown in detail in Figs. 29, 30 and 31. S represents an arm secured by the screw y in a socket in the turret. It has secured to it near its outer end a bracket z, upon which is pivoted the movable member U of the holding jaw, normally held closed by the spring V, but which may be held in open position by the pivoted catch W. The outer end of the bar S which forms the stationary member of the holding jaw, and the corresponding lower face of the pivoted jaw, have corresponding grooves or notches X, formed in them, and when the pin Y, on the lever R, strikes the upper jaw, it compresses the wire blank, and flattens and forms the notches in the head of the needle, as shown in Fig. 44. Y' is an adjustable backing bolt in opposition to the pin Y. Thus the holding jaws K, in addition to the function of holding the blank, for all the successive operations, also act as dies for performing the first reducing operation. When the holding jaw is presented for the entrance of the wire, it has already been opened by the pin Z on the arm R', movable with the lever R, and the catch W has swung to normal position to hold the jaws open. When the blank has been inserted, the projection Q' also carried by lever R, bears against the beveled face of the catch W, and trips it, to allow the jaws to close. The catch W is controlled by the spring W'. At the first station, therefore, it will be seen that the wire is fed into the holding jaws, the catch W is tripped by projection Q', to cause the jaws to clamp the material, the projection or pin Y forces the jaws together to form the head on the needle, and the pin or projection Q operates the movable cutter to sever the blank from the wire strip.

Referring now to Figs. 1, 3, 27, 29 and 30, the turret or carrier T comprises a head mounted above the base plate, on a vertical shaft 1, projecting therethrough, and has a plurality of radial sockets to receive the arms S, and thus a plurality of radially extending holding jaws are provided, usually greater in number than the number of operations to be performed on a blank. The shaft 1 beneath the bed plate is provided with a ratchet wheel 2, and the turret is intermittently rotated to present the holding jaws successively to the different tools. This intermittent movement is imparted through the bar 3, guided in ways in brackets 4, attached to the under side of the bed plate. A pin 5 on the end of the bar, engages the teeth in the ratchet wheel 2, and turns the same step by step. The bar 3 at its opposite end is pivoted to a horizontal lever 6, pivoted at 7 to the machine frame, and this bar 6 carries a roller 8, which runs in a cam groove 9 formed in the upper face of the worm wheel E, on the vertical shaft F. As this shaft rotates, therefore, the lever 6 is swung on its pivot 7, and lever 3 advanced and retracted to rotate the turret. After the blank has been cut from the wire, and the head flattened to give the blank the form shown in Fig. 44, the next step is to swage down the end to the form shown in Fig. 45. The turret is, therefore, rotated to present the blank to the swaging tool shown as a whole at 10 in Fig. 1, and in detail in Figs. 7 and 8. The swaging tool itself is of a well known construction, and its details need not be mentioned here; it is, however, operated by independent belt connection from the belt pulley 11 to the power shaft.

It is not deemed necessary to specifically describe the swaging tools herein shown, inasmuch as they are like the tools shown in the well-known Dayton swaging machine patents.

To provide for the bodily movement of the swaging tool toward and from the blank carried by the turret, means are provided as shown in the plan view, Fig. 1. The swaging tool as a whole is guided in ways 12, secured to the base plate, and the reciprocating movement is imparted to the tool slide from the shaft I. On this shaft I is a barrel 13, having a V-shaped cam groove, in which fits a roller 14, in the end of one arm of a bell crank lever 15, pivoted to the base plate A. The other arm 16 of the bell crank lever is forked to embrace a pin on the swaging machine tool slide, and in the rotation of the shaft I, the bell crank lever is oscillated, and the slide moved alternately up to and away from the work held in the turret.

Figure 46:

The next step in the operation is to clip off the surplus length of the blank due to the swaging, and this is accomplished by the mechanism shown in plan view, Fig. 1, and in Figs. 9, 10 and 11, the blank after this operation presenting the appearance shown in Fig. 46. Attached to the base plate A is a block and longitudinally adjustable on this block by the adjusting screw 18, is a head 19 having an upright portion 20, to the face of which is adjustably secured by slot and screw, the plate 21, formed with an upper beveled knife portion 22. The head of a screw 23 on the slide 19, may be adjusted to bear against the under side of the plate 21, and hold it rigidly against downward displacement during the clipping action. The horizontal knife plate which carries knife 24, is secured by slot and screw to the pivoted supporting bar 25, as at 26, to the head 19. The knife plate is adjustable horizontally by the screws 27. An arm 28 extends from the bar 25, and rests on a cam 29 carried by the shaft G. As the shaft G rotates, the cam alternately raises and allows the arm 28 to fall, thus swinging the bar 25 on its pivot, and causing the clipping action of the knives, or the separation thereof. The movement of the parts is so timed, that the knives 24 and 22 are separated when the turret is rotating, so that the end of the blank to be clipped off will come into position between the two knives, and when the turret has come to a stop, the arm 28 will be raised by cam 29, and the clipping take place.

Figure 47:

The next operation on the blank is the swaging down of the point, as shown in Fig. 47. A second swaging tool 30, similar to and similarly supported and operated to the swaging tool 10, is provided. This is shown in plan in Fig. 1, and the cam for reciprocating the slide which carries it, is shown in Figs. 12 and 13. On the shaft G is a disk 31, having a cam groove 32 in which runs a roller 33 on the end of the arm 34, on the swaging tool slide 35. As the shaft G rotates, the swaging tool slide is reciprocated to and from the carrier or turret.

Figure 48:

The next operation to be performed upon the blank is that of forming the noucat or eye, and flattening the blank adjacent thereto, that is, for completing the needle up to the form in which it is shown in Fig. 48. The mechanism for performing this work is shown assembled in the plan view, Fig. 1, and more in detail in Figs. 14 to 19, inclusive, while Figs. 20, 21 and 27 illustrate the cam disk for giving the movements to the tools performing this operation. On the vertical shaft F above the bed plate is a cam disk 36, having secured within its rim on the upper face, blocks 37 to form a cam groove 38, and having secured within its rim on the lower face, blocks 39 to form a cam groove 40. The tool slide 41 is guided in ways 42 on the base plate A, and the reciprocatory movement to and from the turret or blank holder is imparted through the roller 43 on the lever 44, pivoted at 45 to the base plate, and at the other end pivoted to the rod 46, secured to the projection 47 on the tool slide. This roller 43 runs in the cam groove on the disk 36, and as the shaft F rotates, the tool slide is moved bodily back and forth. The tool slide 41 is shown in plan, side and end elevation in Figs. 14, 15 and 16, respectively. This mechanism is composed of a pivoted member 48, pivoted at 49 to the bracket 50, and carrying on its short arm the tools 51 and 52, secured to a plate 53 therein and backed by the adjusting screws 54. These tools 51 and 52 coöperate with rigid opposing members or anvils 55 and 56 on the tool slide. The lever 48 is normally under pressure of the spring 57 to hold the movable eye-cutting and flattening tools 51 and 52 away from the corresponding stationary tools, and allow the wire blank to pass into the jaws of the tool, when the slide is moved up to the work. To cause the lever to operate to compress the blank to perform the operations, said lever has near one end a socket to receive one end of a link 58, which has a knuckle joint connection with an arm 59 on the upper end of the shaft 60, which at its lower end has a crank connection with the arm 61 attached to the arm 62, pivoted at one end to the lever 63, which is centrally pivoted at 64 to the base plate, and carries on the other end a roller 65, which runs in the cam groove 38 on the disk 36. As the cam disk rotates, therefore, the toggle formed by the knuckle joint connection between 58 and 59, is alternately flexed and straightened, thus performing the operation of cutting the noucat, and flattening the needle, and releasing it to allow another blank to be presented by the succeeding holding jaw.

Figure 49:
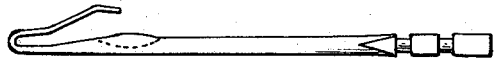
Figure 50:

The next operation necessary to complete the needle, is that of bending over the beard, and this is done in two steps, first, a partial bending to give the needle the appearance shown in Fig. 49, and then the final bend, as shown in Fig. 50. As herein shown, I so connect up the mechanism for giving these two steps, that they move back and forth together; the one bending tool is operated from the mechanism which operates the bending tool of the other, but it will be understood that I do not wish to be limited in this respect. This mechanism is shown in plan in Fig. 1, and more in detail and enlarged in plan and side elevation in Figs. 22 and 23, and details of the parts in Figs. 24, 25 and 26. The sliding block 66 which carries the tools, is guided in the ways 67 on the base plate A. This tool slide has attached to it an arm 68, which has an upward projection 69, carrying a head 70, to which is secured a roller 71, traveling in the groove in the cam 72 on the shaft H. By this arrangement, the tool slide 66 is moved toward and away from the turret. This tool slide has secured to it a head 73, to which is attached a bracket 74, to which is pivoted a lever 75, having a pivotal connection at on end to the arm 76 pivoted at its lower end to the arm 77. Said arm 77 is also pivoted at its opposite end at 78 to the machine bed, and intermediate its ends carries a roller 79 running in a groove in the cam 80 on the shaft H. The lever 75 has at its outer end a head 81, in which is fastened a vertical rod 82, carrying at its lower end a former or anvil 83, around which the beard of the needle is formed or bent. As the cam 80 rotates, the former 83 is raised or lowered, being normally held in lowered position by the spring 84. Journaled in the slide 66 is an upright shaft 85, provided with a sleeve secured thereon, a portion of which sleeve is geared as at 86, and is formed with a rounded enlarged top 87, having secured to it a forming plate 88, as shown in Fig. 24. An adjustable plate 89 extends part way over the top of the part 87, to a point adjacent the former 83, leaving just space between for the passage of the needle. The rotation of the vertical shaft and enlarged top 87, carries the former plate 88 against the needle point projecting beyond the former or anvil 83, which is substantially concentric with the shaft 85, and bends the needle around the former 83, thus performing the first operation of bending the beard. Oscillatory movement is imparted to the shaft 85 by means of the rack bar 90, which extends transversely of the tool slide, and beyond the same, and is pivoted at 91 to the block 92 held in the slot 94 of the lever 93, which is pivoted as at 95 to the machine base plate. This lever 93 is oscillated by engagement of its cam roller 96 with the face cam 97 on the shaft H. As the cam 97 rotates, the rack bar 90 slides back and forth, and oscillates the former plate 88 around the anvil or former 83. This brings the needle blank to the state shown in Fig. 49. An additional operation is necessary to complete the needle, as it is shown in Fig. 50, and to this end another bending tool is provided; it consists merely of two jaws 98 and 99, one stationary and the other movable, which press against the needle the beard already formed. The tools are movable toward and from the work, as the tool slide 66 reciprocates by reason of the fact that they are supported on the plate 100, secured to the adjustable plate 101 on the tool slide. The movable tool 99 is carried on an arm 102, pivoted at 103 to the block 104, sliding in the slot 94 on the lever 93. As the tool slide 66 moves back and forth, the block 104 moves back and forth in the slot, and as the lever 93 oscillates, it swings the arm 102 on its pivot, and draws the tool 99 toward and away from the tool 98. A spring 104' keeps the lever 93 in normal position. In the operation of these parts thus described, the tool slide 66 moves forward to the turret under the action of the cam 72, and the tools move with it, the former 83 is forced down by cams 80 and levers 77, 76 and 75, the needle blank on one of the jaws of the turret comes in between the former 83 and the end of the plate 89, and the point projects over the table 87, the cam 97 oscillates the lever 93 and reciprocates the rack bar 90, which meshes with the gear 86 and causes the former 88 to bend the needle around the former 83. At the same time, the preceding needle blank which has been subjected to this operation, is squeezed between the jaws 98 and 99, by reason of the lever 93 in its movement causing the swinging of lever 102 on its pivot.

After the last bending operation has been performed, so far as the finished needle shown in Fig. 50 is concerned, all that remains is to release the holding jaws and discharge the needle. This is accomplished by means of the pin Z on the arm R', which in the descent of the arm R' strikes the rear end of the jaw U and forces it down, allowing the catch W to swing forward, and engage the end, and hold the jaw open, and the needle is forced out of the jaw by coming in contact with a plate 105 in its path above a receptacle for holding them; the needles are then ready for the hardening process.

I have referred in the description of the first operation performed on the needle blank, to the arm or lever R, and the various projections Q, Y, Q', carried thereby for operating the cutter, the dies for flattening the head, and for tripping the catch to allow the jaws to close. I have also referred to the arm R' carrying the projection Z, which opens the jaws far enough to allow the catch W to engage the same and hold them open and I will now proceed to describe the means for operating these arms R and R'.

Carried by the vertical shaft F is a cam 106, engaging a roller 107 on the end of the lever 108, which is pivoted at 109 to the bracket 110, and at its other end is pivotally attached to the vertical rod 111, which passes up through the base plate, and is attached at 112 to the arm R, which at its end at the front of the machine is sleeved on the shaft 113, journaled in bearings 114 on the bracket 115. The arm R' is also secured to the shaft 113. As the lever 108 is swung up and down by the cam 106, the arm R is raised and lowered, rocking the shaft 113, which also swings the arm R' and causes the projections referred to, to operate in the manner indicated.

In certain styles of knitting machines, the heads of the needles are not held in by leads, but by having a bent end, as shown in Fig. 43. I have, therefore, provided for attachment to this machine, an additional bending and cutting-off mechanism to follow the final operations of bending over the beard. In making this style of needle, no change is made in the action of the mechanism, in regard to the other operations, except an adjustment of the tools to accommodate a greater length of blank, for the notched head made in the first operation is cut off at the final operation. This notching operation might be dispensed with, but I prefer to perform it, for by having these notches, the blank is held much more firmly in the holding jaws. This additional or supplemental mechanism is shown in plan in Fig. 32, in side elevation in Fig. 35, and the cutter and operating means therefor in Fig. 39, and Figs. 36 to 41 inclusive, represent details. On the shaft H, toward the front end of the machine, is a cam 116, adapted in its rotation to swing back and forth a vertical lever 117. To this vertical lever is pivoted at 118, one end of a horizontal arm 119, adjustably connected to the horizontal arm 120, which has a crank connection through the link 121 with the vertical shaft 122. This shaft has a casing or sleeve 123 around it, having a head 124 on its lower end, carrying a projection 125 engaging a cam surface 126 on the base, and as the shaft 124 is oscillated, the sleeve or casing rises bodily, the pivotal connection 118 permitting this; thus allowing the jaws 127 to embrace between them the needle. The shaft 122 carries a geared segment 128 which meshes with a gear 129 on the shaft 130, on which shaft is also the bending tool 131, having a beveled face 132. As the shaft 130 rotates. the bending tool 131 moves from the position shown in full lines in Fig. 38 to the position shown in dotted lines, and bends the needle from the form shown in Fig. 33 to that shown in Fig. 34 or 42.

To complete the needle as shown in Fig. 43, it is necessary to cut it off, and this is done by the cutting mechanism shown in Figs. 39, 40 and 41. This cutting mechanism comprises a standard 133, arranged beneath the arm R'. It has at one end, a bracket 134, to which is pivoted one end of the lever 135, normally spring-pressed upwardly by spring 137, and having its forward end 136 shaped to coöperate with a vertical cutting blade 138, which is stationary and adjustably secured to the face of the head 133, and has a backing screw 139 to prevent displacement under the shock of the blow of the coöperating movable blade 136, which is forced downwardly by the projection 140, carried by the arm R', which is raised and lowered as the rock shaft 113 is oscillated.

When the needle blank is severed, the body of the needle drops into a receptacle, and the same movement of lever R' which does the cutting, also opens the holding jaws, and allows the cut-off head portion to be released.

It will be seen that my machine is a complete organized machine for automatically making spring beard needles, the wire blank being fed from the roll, cut off, and successively operated upon by the various tools to which it is presented by the holding jaws, and by the addition of the mechanism last described, without any change in the organized apparatus, a different type of needle may be made.

It will be understood that although the tool slides are all independently movable toward and from the turret or carrier, that they are properly timed so as to move in unison and permit all the tools to be operating at the same time, the turret having a dwell imparted to it after each movement, this dwell being timed to correspond with the longest operation to be performed, viz., the first swaging operation.

Various modifications and changes may be made, within the scope of the appended claims.

Having thus described my invention, what I claim as new and desire to secure by Letters Patent, is:—

1. An automatic machine for making spring beard needles, comprising a single turret with holding jaws for the blanks, and means for rotating the turret with a step by step movement, a series of compression tools for forming the reducing operations upon the blank, the holding jaws themselves being one of the compression tools, and the other compression tools performing the other operations of reduction, and a series of bending tools for forming the beard upon the needle, all of said tools except the first compression tool or holding jaw, being movable toward and from the turret.

2. In an automatic machine for making spring beard needles, an intermittently rotatable turret having holding jaws, said holding jaws being constructed as forming dies with means for compressing them to form notches or flats on the heads of the blanks, and a series of reducing and bending tools movable to and from the turret for performing the subsequent operations upon the blanks.

3. An automatic needle-making machine, comprising means for feeding the wire blank, a rotating turret or carrier having holding jaws for the blanks, compression tools movable to and from the turret, bending tools and a slide carrying the same, movable to and from the turret.

4. An automatic needle-making machine, comprising means for feeding the wire blank, a rotating turret or carrier, having holding jaws for the blanks, swaging, eye-cutting and flattening and bending tools, movable to and from the turret, and a movable support for the bending tools.

5. An automatic spring beard needle machine, comprising a rotarily mounted turret or carrier, having holding jaws for the blanks, and a series of slides movable toward and away from the turret or carrier, a plurality of swaging tools carried by respective slides, an eye-cutting and flattening tool carried by another of said slides, and a plurality of bending tools carried by another slide.

6. An automatic spring beard needle machine, comprising a rotarily mounted turret or carrier, having holding jaws for the blanks, a series of slides movable toward and away from the turret or carrier, a plurality of swaging tools carried by respective slides, an eye-cutting and flattening tool carried by another of said slides, and two bending tools carried by another of said slides.

7. An automatic spring beard needle machine, comprising a rotatably mounted turret or carrier, having holding jaws for the blanks, a cutter for cutting the blank from the stock, and means for operating the cutter, and means for opening the jaws to release the finished blank, both said means being carried by the same rocking frame.

8. An automatic spring beard needle machine, comprising a rotatably mounted turret or carrier, having holding jaws for the blanks, a cutter for cutting the blank from the stock, means for operating the cutter, means for opening the jaws to release the finished blank, both said means being carried by the same rocking frame, a catch for holding the jaws open, and a trip also carried by said rocking frame, to release the catch and allow the jaws to close.

9. An automatic spring beard needle-making machine, comprising a rotarily mounted turret or carrier, having holding jaws for the blanks, swaging, pressing and bending tools movable to and from the carrier or turret, a cutter for cutting the blank from the stock, and a tool for clipping off the surplus length after swaging.

10. An automatic spring beard needle-making machine, comprising a rotarily mounted turret or carrier having holding jaws for the blanks, swaging tools and a clipper located between the two swaging tools, eye-cutting and flattening tools, and bending tools, said tools being movable toward and from the turret or carrier.

11. In a needle-making machine, a rotarily mounted turret or carrier, having holding jaws for the blanks, swaging, pressing and bending tools, and a supplemental bending tool for bending the entire needle at right angles to the jaws, and means for clipping off the needle between the bend and the jaw.

12. In a needle-making machine, and in combination, a wire-feeding device, including a slide, and means for operating it, gripping jaws carried by said slide, means for closing the jaws, a cutting mechanism also carried by said slide, means for operating it, a holding device for the blanks, means for releasing the movable jaw of the holding device to allow it to close, said means and the means for operating the cutter being all mounted on the same rocking frame.

13. In a needle-making machine, and in combination, a wire-feeding device, including a slide and means for operating it, gripping jaws carried by said slide, means for closing the jaws, a cutting mechanism also carried by said slide, means for operating it, a holding device for the blanks, means for releasing the movable jaw of the holding device to allow it to close, said means and the means for operating the cutter being all mounted on the same rocking frame, and means for depressing the movable jaw to compress and form the blank, also mounted on the rocking frame.

14. A turret having normally closed holding jaws for the blank, said jaws being constructed as forming dies, and means for compressing the jaws upon the material to shape the blank.

15. In a machine of the character described, a movable slide, a lever pivoted thereto, an eye-cutting and flattening tool carried by the pivoted lever, corresponding stationary tools carried by the slide, and means for moving the slide and for swinging the lever.

16. In a machine of the character described, a movable slide, a lever pivoted thereto, an eye-cutting and flattening tool carried by the pivoted lever, corresponding stationary tools carried by the slide, means for moving the slide and for swinging the lever, said means including a rotating disk having cam grooves, and lever connections between the cam grooves and the slide and pivoted lever.

17. In a machine of the character described, a movable slide, a lever carrying an eye-cutting tool and a flattening tool and pivoted to the slide, stationary corresponding tools, means for moving the slide, and means for operating the pivoted lever including a vertical shaft on the slide, and a toggle lever connection between the shaft and the pivoted lever, and means for flexing and straightening the toggle lever.

18. In a machine of the character described, a movable slide, a lever carrying an eye-cutting tool and a flattening tool and pivoted to the slide, stationary corresponding tools, means for moving the slide, means for operating the pivoted lever, including a vertical shaft on the slide, a toggle lever connection between the shaft and the pivoted lever, means for flexing and straightening the toggle lever, said means including a series of levers and a cam disk on a driven shaft for operating the same, and the means for moving the pivoted slide, including a lever also operatively connected to the cam disk.

19. The blank-holding jaws comprising the stationary member, the movable member pivotally secured thereto, a spring for keeping the jaws normally closed, and a pivoted catch for holding them in open position.

20. In a machine of the character described, a movable slide, a bending tool carried thereby, a second bending tool also carried thereby, a rack and gear for oscillating the first bending tool, an oscillating lever for reciprocating the rack, and connections between the oscillating lever and the movable member of the second bending tool for operating the latter.

21. In a machine of the character described, a movable slide, a bending tool carried thereby, a second bending tool also carried thereby, a rack and gear for oscillating the first bending tool, an oscillating lever for reciprocating the rack, connections between the oscillating lever and the movable member of the second bending tool for operating the latter, and a reciprocating former as 83, around which the first bending tool bends the blank.

22. In a machine of the character described, the bending tool, comprising the oscillating former 88, the anvil or former 83, the gear wheel on the shaft of the second former, a rack bar engaging the gear, with means for reciprocating the rack bar, including a horizontally oscillating lever as 93, to which the rack bar is pivoted, a second bending tool, one member of which has a pivotal engagement with the lever 93.

23. In a machine of the character described, a movable slide, bending devices carried by said slide, including a vertically swinging former, around which the article is to be bent, and an oscillating bending former with means for operating it to cause it to bend the article around the first former.

24. In a machine of the character described, a movable slide, bending devices carried by said slide, including a vertically swinging former around which the article is to be bent, and an oscillating bending former with means for operating it to cause it to bend the article around the first former, and a second bending tool including a fixed and a movable jaw, with means for moving the latter.

25. In a machine of the character described, a movable slide, bending devices carried by said slide, including a vertically swinging former, around which the article is to be bent, an oscillating bending former with means for operating it to cause it to bend the article around the first former, said means including a horizontally swinging lever, with connections between it and the oscillating bending former, and a second bending tool including a fixed jaw carried by the movable slide, and a movable jaw connected to the pivoted lever, to be operated thereby.

26. In a machine of the character described, a movable slide, bending devices carried by said slide, including a vertically swinging former around which the article is to be bent, an oscillating bending former with means for operating it to cause it to bend the article around the first former, said means including a horizontally swinging lever, a rack bar pivotally secured at one end thereto, and having teeth engaging a gear on the oscillating former shaft, and a second bending tool including a fixed jaw carried by the movable slide, and a movable jaw connected to the pivoted lever, to be operated thereby.

27. In a needle-making machine, a rotarily mounted turret or carrier, having holding jaws for the blanks, a series of tools for performing successive operations on the blank, including a bending tool for forming the beard on the needle, and a supplemental bending tool for bending the entire needle as it is held in the jaws.

28. In a needle-making machine, a rotarily mounted turret or carrier having holding jaws for the blanks, a series of tools for performing successive operations on the blank, including a bending tool for forming the beard on the needle, a supplemental bending tool for bending the entire needle as it is held in the jaws, and means for slipping off the needle between the bend and the jaws.

29. In a machine of the character described, a supplemental bending tool, a slide supporting the same, and means for moving the slide vertically to bring the tool into position to engage the article to be bent, and means for oscillating the tool.

30. In a machine of the character described, a slide carrying guiding blocks for the article, means for vertically moving said slide, a shaft carried by and movable with said slide, a gear on said shaft, a bending tool also on said shaft, and a gear segment, meshing with said gear, and means for oscillating the segment.

31. In a machine of the character described, a slide, a shaft carried thereby, a gear segment on said shaft, a cam carried by said shaft and engaging a stationary cam face, whereby the shaft and slide are raised and lowered, a gear wheel in mesh with the gear segment, and a bending tool on the shaft of the gear wheel, and means for oscillating the first shaft.

In testimony whereof I affix my signature, in presence of two witnesses.

WILLIAM H. DAYTON.

Witnesses:
D. HILDRETH,
CHAS. M. HIBBARD.